(12) United States Patent
Pawlowski et al.

(10) Patent No.: US 6,385,687 B2
(45) Date of Patent: May 7, 2002

(54) METHOD AND APPARATUS FOR SIMULTANEOUSLY ACCESSING THE TAG AND DATA ARRAYS OF A MEMORY DEVICE

(75) Inventors: J. Thomas Pawlowski; Joel Watkins, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/312,122

(22) Filed: May 14, 1999

(51) Int. Cl.$^7$ ............................................... G06F 12/00
(52) U.S. Cl. .......................... 711/3; 711/118; 711/167; 711/217
(58) Field of Search ...................... 711/3, 118, 217, 711/167, 168

(56) References Cited

U.S. PATENT DOCUMENTS

| | | | | |
|---|---|---|---|---|
| 5,603,007 A | * | 2/1997 | Yazdy et al. ................. 395/467 |
| 5,768,560 A | * | 6/1998 | Lieberman et al. ......... 395/494 |
| 5,915,262 A | * | 6/1998 | Bridgers et al. ............. 711/143 |
| 5,809,537 A | * | 9/1998 | Itskin et al. ................. 711/146 |
| 5,924,121 A | * | 7/1999 | Arimilli et al. .............. 711/143 |
| 5,960,453 A | * | 9/1999 | Pawlowski ................... 711/118 |
| 5,966,343 A | * | 10/1999 | Thurston .................... 365/233 |
| 5,987,570 A | * | 11/1999 | Hayes et al. ................ 711/140 |

OTHER PUBLICATIONS

The Cache Memory Book, Jim Handy, @1993, pp. 21,65, 1993.*

* cited by examiner

Primary Examiner—Matthew Kim
Assistant Examiner—Christian P. Chace
(74) Attorney, Agent, or Firm—Williams, Morgan & Amerson, P.C.

(57) ABSTRACT

A memory device includes a data array, a tag array, and control logic. The data array is adapted to store a plurality of data array entries. The tag array is adapted to store a plurality of data array entries corresponding to the data array entries. The control logic adapted to access a subset of the data array entries in the data array using a burst access and to access the tag array during the burst access. A method for accessing a memory device is provided. The memory device includes a data array and a tag array. The method includes receiving a data array burst access command. The data array is accessed in response to the data array burst access command. A tag array access is received. The tag array is accessed in response to the tag array access command while the data array is being accessed.

25 Claims, 5 Drawing Sheets

METHOD AND APPARATUS FOR SIMULTANEOUSLY ACCESSING THE TAG AND DATA ARRAYS OF A MEMORY DEVICE

BACKGROUND OF THE INVENTION

1. Field of the Invention

This invention relates generally to memory devices, and more particularly, to a memory device having simultaneously accessible tag and data arrays.

2. Description of the Related Art

In many computer systems high speed, redundant memories have been used to store recently used or anticipated use data. The memories are referred to as cache memories. A cache memory mirrors data stored in the main memory of the computer system, but because of its significantly higher speed, cache data may can be retrieved quickly. Typically, dynamic random access memories (DRAM) are used as main memory devices due to their high density. Cache memories are typically static random access memories (SRAM). SRAMs have a lower density than DRAMs, but they are significantly faster.

One type of SRAM is a synchronous burst SRAM. This type of SRAM includes a burst counter for generating internal addresses to sequentially access a plurality of cells in the SRAM. These internal addresses may be generated, and the sequential cells may be accessed more quickly than if the SRAM were to be externally addressed. Typically these burst accesses may access four or eight internal accesses.

Data is organized in a cache using tag and data arrays. The data array stores the redundant data corresponding to data stored in the main memory. The tag array stores identifying information to cross-reference the cache data stored in the data array to the main memory data. The tag array also stores status information regarding the status of the cache data (e.g., the cache data is valid or invalid, the cache data has been updated without having been written to the main memory, etc.).

While burst accesses do provide quicker access to the cache data, they also have at least one drawback in that the tag array cannot be accessed during the burst. For example, consider that an eight cycle burst is in progress, and the cache receives a subsequent request for a tag lookup to determine if certain data is stored in the data array. The cache must wait for the burst access to complete before the tag lookup can commence. If the tag lookup misses (i.e., the data is not present in the cache), the computer system must then issue a request to retrieve the data from the main memory, a relatively slow process. Waiting for the burst access to complete adds additional latency to the operation of the cache. As the length of burst accesses increases, corresponding to larger cache sizes, the latency problem is exacerbated.

The present invention is directed to overcoming, or at least reducing the effects of, one or more of the problems set forth above.

SUMMARY OF THE INVENTION

One aspect of the present invention is seen in a memory device including a data array, a tag array, and control logic. The data array is adapted to store a plurality of data array entries. The tag array is adapted to store a plurality of data array entries corresponding to the data array entries. The control logic adapted to access a subset of the data array entries in the data array using a burst access and to access the tag array during the burst access.

Another aspect of the present invention is seen in a method for accessing a memory device. The memory device includes a data array and a tag array. The method includes receiving a data array burst access command. The data array is accessed in response to the data array burst access command. A tag array access is received. The tag array is accessed in response to the tag array access command while the data array is being accessed.

BRIEF DESCRIPTION OF THE DRAWINGS

The invention may be best understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
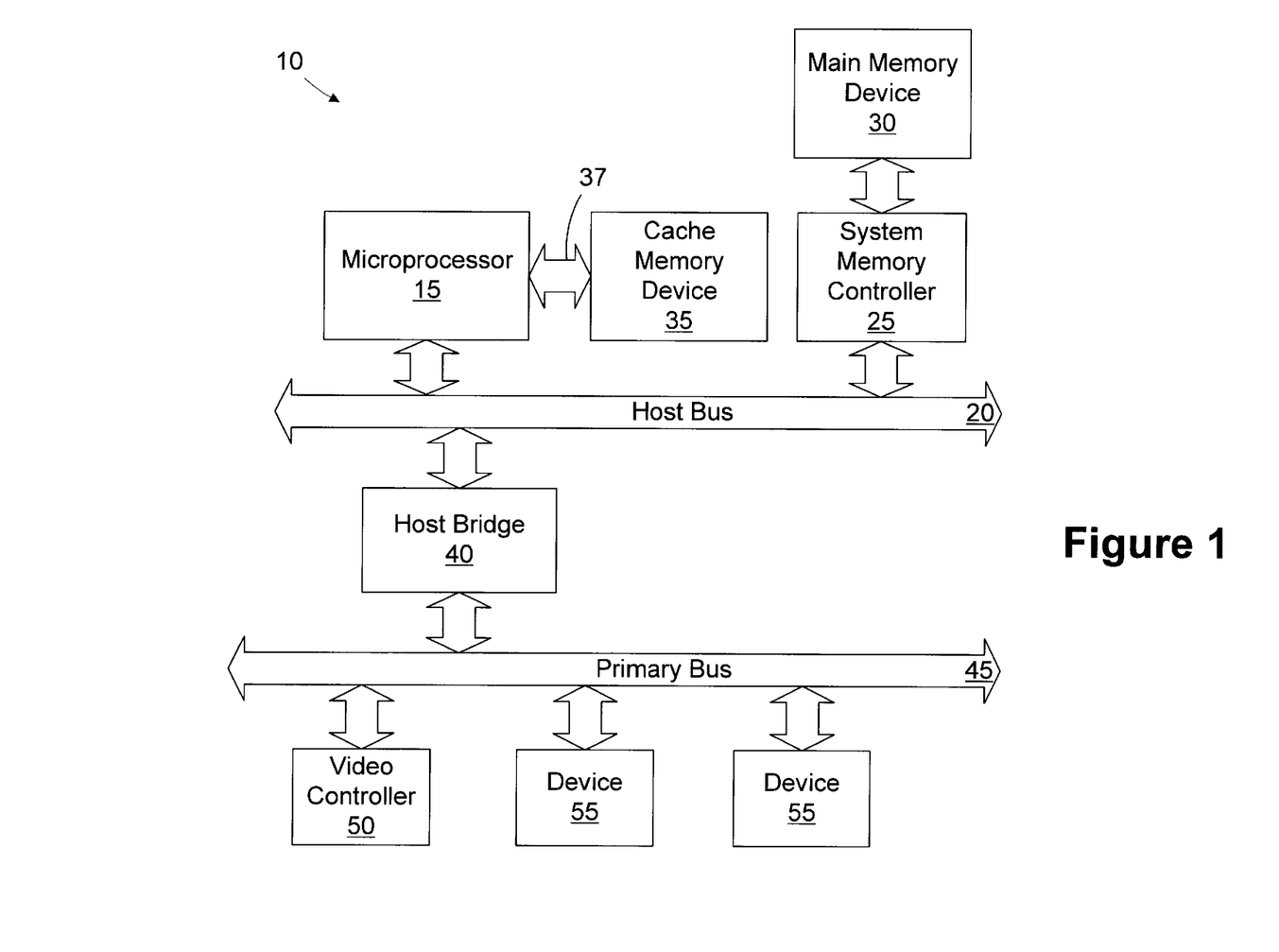
FIG. 1 is a simplified block diagram of a computer system in accordance with the present invention.

Referring to FIG. 1, a simplified block diagram of a computer system 10 is provided. The computer system 10 includes a microprocessor 15, which may include multiple processors (not shown), coupled to a host bus 20. A system memory controller 25 is coupled to the host bus 20 and a main memory device 30. A cache memory device 35 is coupled to the microprocessor 15 by a cache bus 37. A host bridge 40 couples the host bus 20 to a primary bus 45, such as a peripheral component interconnect (PCI) bus (PCI Specification, Rev. 2.1). A video controller 50 and other devices 55 (e.g., PCI devices) are coupled to the primary bus 45. The computer system 10 may include other buses such as a secondary PCI bus (not shown) or other peripheral devices (not shown) known in the art.

Except for the cache memory device 35 of the present invention, all other elements 15–30, 40–55 of the computer system 10 are intended to represent a broad category of these elements found in many computer systems. Their constitutions and functions are well known in the art, and for the sake of clarity, are not further described herein.

In the illustrated embodiment, the cache memory device 35 is a static random access memory (SRAM), and although the SRAM is described as it may be used in a cache application, the application of the invention is not so limited. The techniques and structure described herein may be applied to memory devices in other applications, as well as other types of memory devices. It is contemplated that the cache memory device 35 may include a plurality of devices operating in parallel, depending on the specific bandwidth or other design requirements of the computer system 10. Hereinafter, the cache memory device 35 is referred to as simply the memory device 35.

Figure 2:
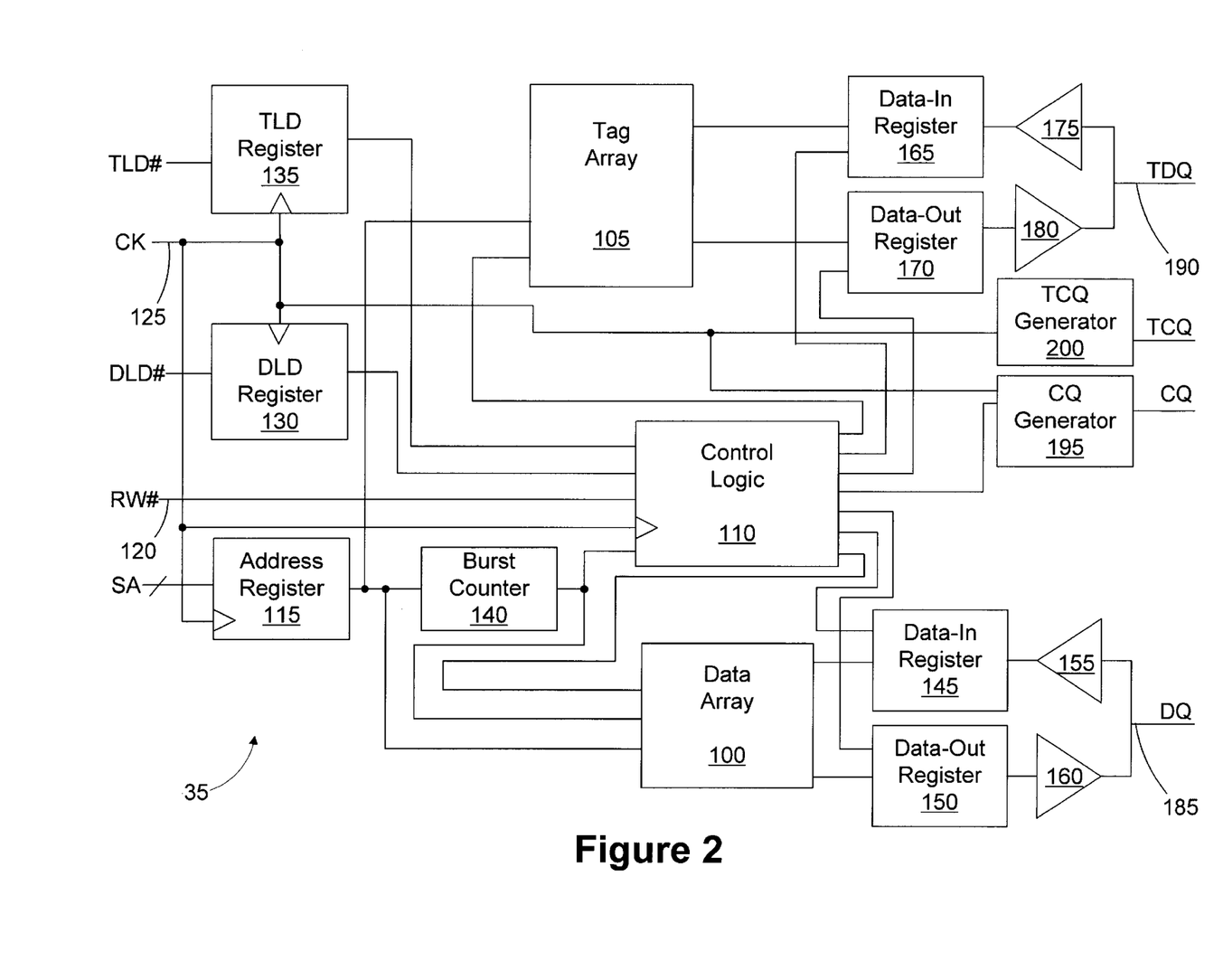
FIG. 2 is a block diagram of a memory device in the computer system of FIG. 1.

Referring now to FIG. 2, a block diagram of the memory device 35 is provided. The memory device 35 includes a data array 100, a tag array 105, and control logic 110. As is well known in the art, the data array 100 stores cache data corresponding to data in the main memory device 30, and the tag array 105 stores tag data related to the identification and status of the cache data stored in the data array 100. In the illustrated embodiment, the data array 100 has a size of about 4.5 Mb and the tag array 105 has a size of about 128 kb.

The control logic 110 controls, among other things, access to the data and tag arrays 100, 105. The operation of the control logic 110 related to accessing the data and tag arrays 100, 105 is described in greater detail below in reference to the state diagram of FIG. 3 and the timing diagram of FIGS. 4A and 4B.

As used herein, a pound sign (#) suffix on a logic signal name indicates that the logic signal is asserted low (i.e., a logic 0 indicates assertion, a logic 1 indicates de-assertion). The data and tag arrays 100, 105 share an address register 115 for receiving a shared address (SA), a read/write control line 120 for receiving a read/write signal (R/W#), and a clock line 125 for receiving a clock signal (CK). A data array command (DLD) register 130 is adapted to receive a data access command (DLD#), and a tag array command (TLD) register 135 is adapted to receive a tag command (TLD#). In the illustrated embodiment, the memory device 35 is capable of double data rate accesses to the data array 100. In a double data rate accesses data is read from or written to the data array 100 on both the rising and falling edges of the CK signal. In the illustrated embodiment, accesses to the tag array 105 are performed using a single data rate (i.e., on the rising edge of the CK signal).

In the illustrated embodiment, the memory device 35 may be configured to operate using either a latency of either 1 or 1.5 clock cycles. Latency is typically defined as the number of clock cycles between when a read command is issued and when the data is output from the memory device 35.

A burst counter 140 is coupled to the address register 115 and the control logic 110 for providing sequential internal address for burst accesses. The address of the of the first location in the data array 100 to be accessed is loaded into the address register 115, and subsequently, at least the three least significant bits are loaded into the burst counter 140. On subsequent clock half-cycles of the CK signal, the burst counter 140 is incremented to generate internal addresses for accessing the data array 100.

In the illustrated embodiment, the burst counter 140 is a three-bit counter capable of generating internal addresses for four and eight beat bursts. As used herein the term "beat" refers to the cycle number of the burst access. Because the data array 100 is accessed in a double data rate manner, one beat corresponds to one half cycle of the CK signal. The burst counter 140 may increment the internal address in a linear format or an interleaved format.

The data array 100 has an associated data-in register 145 and a data-out register 150. The input of the data-in register 145 is coupled to a write buffer 155, and the output of the data-out register 150 is coupled to a read buffer 160. Likewise, the tag array 105 has an associated data-in register 165 and a data-out register 170. The input of the data-in register 165 is coupled to a write buffer 175, and the output of the data-out register 170 is coupled to a read buffer 180. The buffers 155, 160 associated with the data array 100 are coupled to DQ lines 185, and the buffers 175, 180 associated with the tag array 105 are coupled to tag DQ (TDQ) lines 190.

The memory device 35 farther includes a data output clock (CQ) generator 195 for generating a data output clock signal (CQ) and a tag output clock (TCQ) generator 200 for generating a tag output clock signal (TCQ). It is contemplated that alternative clocking schemes may be employed. for example, the data output clock signal, CQ, may be looped back to the memory device 35 as a data clock input to achieve a forwarded clock timing back to the microprocessor 15.

The control logic 110 receives the R/W#, DLD#, and TLD# signals, as well as the address output from the burst counter 140. The control logic 110 is adapted to allow simultaneous data array 100 and tag array 105 accesses based on the control signals it receives. The R/W# signal determines if an access is a read access (i.e., when at a logic high level) or a write access (i.e., when at a logic low level). The DLD# signal is asserted low if the access targets the data array 100, and the TLD# signal is asserted low if the access targets the tag array 105. The DLD# and TLD# signals may be asserted simultaneously to indicate that the access targets both the data array 100 and the tag array 105. The control logic 110 allows the tag array 105 to be accessed on beats zero and four of an eight beat burst.

Figure 3:
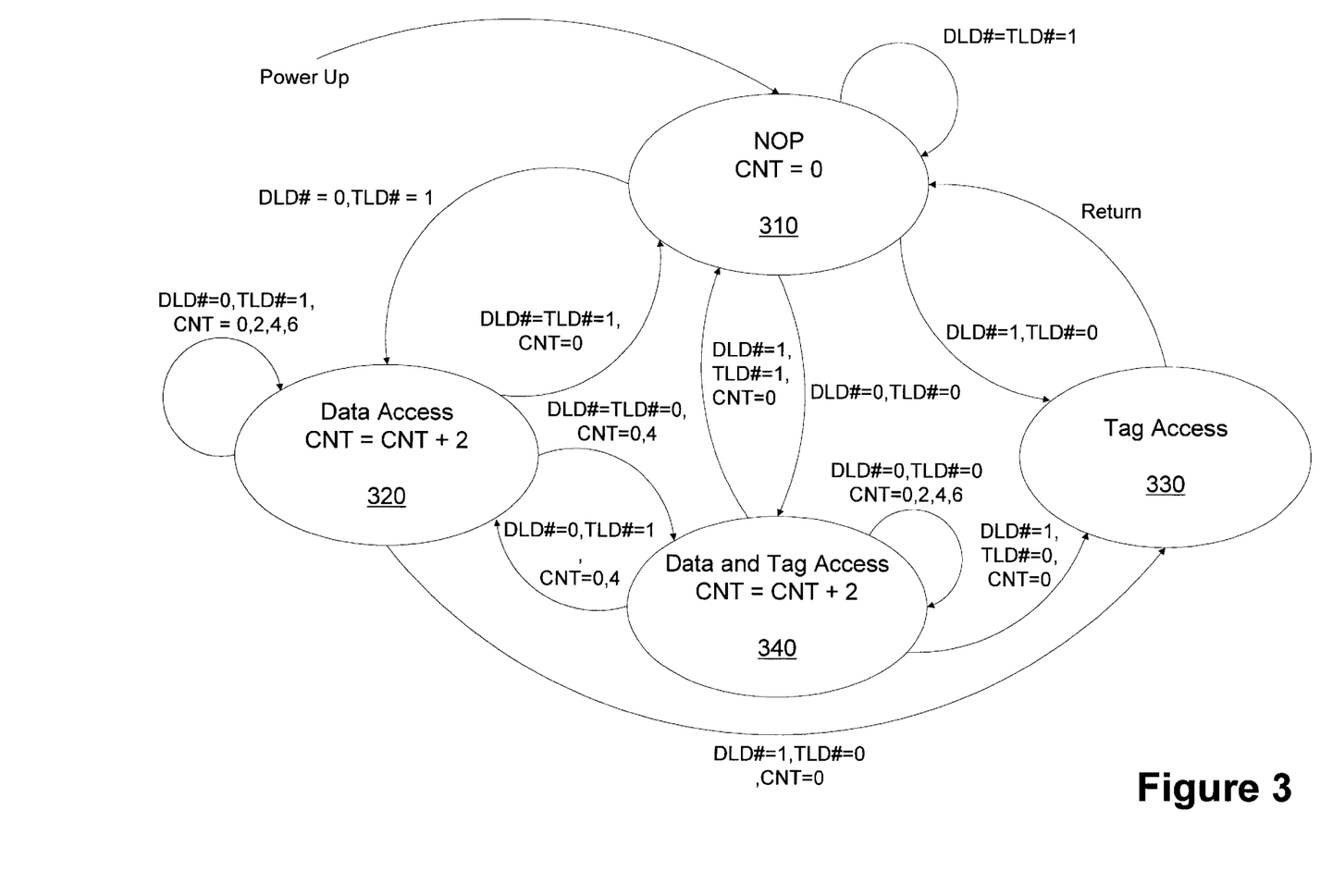
FIG. 3 is a state diagram illustrating the operation of the control logic of the memory device of FIG. 2 for accessing tag and data arrays of the memory device.
Figure 4A:
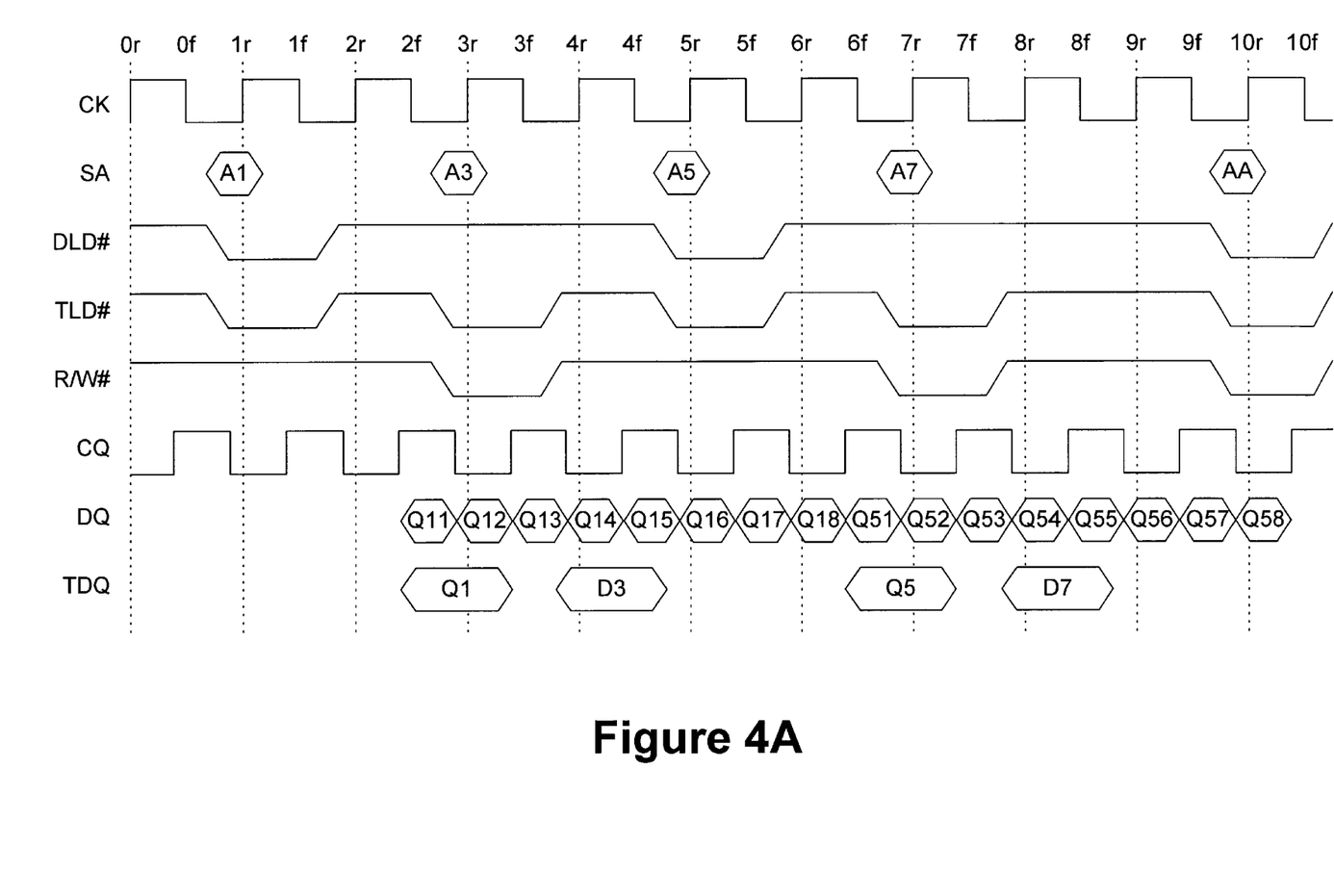
FIG. 4A is a timing diagram illustrating the operation of the memory device of FIG. 2 during a series of tag array and data array transactions.
Figure 4B:
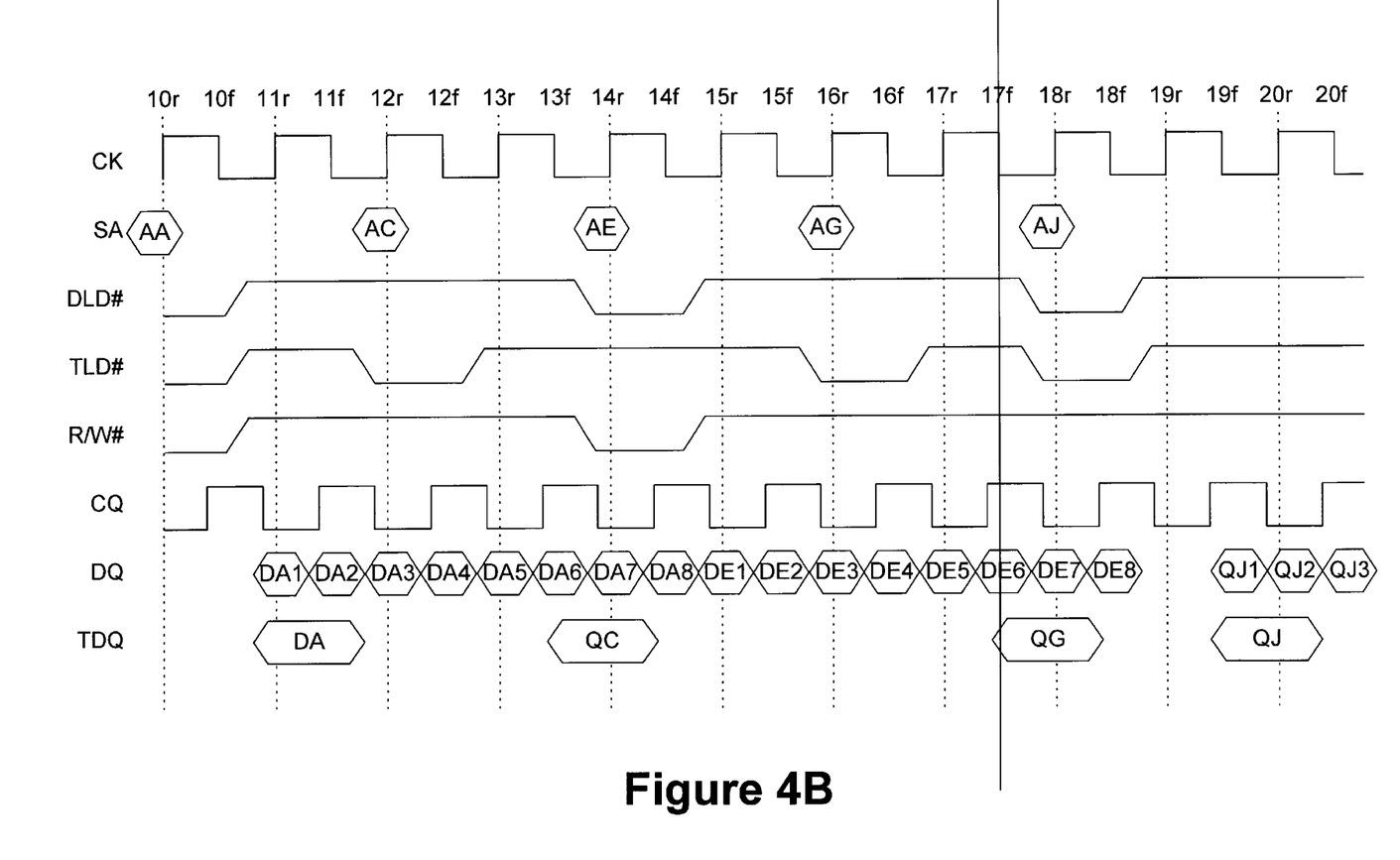
FIG. 4B is a continuation of the timing diagram of FIG. 4A.

The operation of the control logic 110 is further described in reference to FIGS. 3, 4A and 4B. FIG. 3 is a diagram of a bus cycle state machine 300 implemented by the control logic 110 for accessing the data array 100 and tag array 105. FIGS. 4A and 4B show a timing diagram illustrating the timing of the command, address, and data signals during a series of bus cycles.

First, the general operation of the bus cycle state machine 300 of FIG. 3 is discussed. After exiting the power up sequence, the bus cycle state machine 300 enters a no-operation (NOP) state 310. In the NOP state 310, the output of the burst counter 140 (referred to as CNT) remains at 0. The bus cycle state machine 300 remains in the NOP state 310 until a command is received. In response to a data access (i.e., DLD#=0, TLD#=1), the state machine 300 transitions to a data access state 320. In response to a tag access (i.e., DLD#=1, TLD#=0), the state machine 300 transitions to a tag access state 330. In response to a concurrent data and tag access (i.e., DLD#=0, TLD#=0), the state machine 300 transitions to a data and tag access state 340.

In the data access state 320, the data array 100 access is completed and the burst counter 140 is incremented by two (i.e., the burst counter 140 increments by two due to the double data rate nature of the data array 100). The data array 100 burst access continues, and the burst counter 140 keeps incrementing by two corresponding to the beats of the burst access. When the burst counter 140 counts up to eight, it resets to zero. In the illustrated embodiment, the state machine 300 may only leave the data access state 320 when the burst counter 140 has a value of zero or four (i.e., beats 0 or 4 of the burst access). It is contemplated that the state machine 300 may be modified to allow for concurrent data and tag array 105 accesses on other beats, depending on the specific design requirements and the length of the burst accesses.

On beats zero and four, the control logic 110 reads the DLD#, TLD#, and R/W# signals to determine the next command. At all other times, the DLD#, TLD#, and R/W# signals are ignored. If the next command is another data access, the state machine 300 remains in the data access state 320. If the next command is a tag only access (i.e., DLD#=1, TLD#=0, CNT=0), the state machine 300 transitions to the tag access state 330. If the control logic 110 receives a concurrent data and tag access command (i.e., DLD#=0, TLD#=0, CNT=0, 4), the state machine 300 transitions to the data and tag access state 340. If a command is not received by the data array 100 (i.e., DLD#=1, TLD#=1, CNT=0), the state machine 300 returns to the NOP state 310 and waits for the next command.

In the tag access state 330 the tag array 105 access is completed, and the state machine 300 returns to the NOP state 310. The burst counter 140 is not incremented in the tag access state 330.

In the data and tag access state 340, both the data and tag accesses are completed and the burst counter 140 is incremented by two. Similar to the data access state 320, the data array 100 burst access continues, and the burst counter 140 keeps incrementing by two corresponding to the beats of the burst access. Again, when the burst counter 140 counts up to eight, it resets to zero. In the illustrated embodiment, the state machine 300 may only leave the data and tag access state 340 when the burst counter 140 has a value of zero or four. As stated above, it is contemplated that the state machine 300 may be modified to allow for concurrent data array 100 and tag array 105 accesses on other beats, depending on the specific design requirements and the length of the burst accesses.

On beats zero and four, the control logic 110 reads the DLD#, TLD#, and R/W# signals to determine the next command. At all other times, the DLD#, TLD#, and R/W# signals are ignored. If the next command is a data only access (i.e., DLD#=0, TLD#=1, CNT=0, 4), the state machine 300 transitions to the data access state 320. If the next command is a tag only access (i.e., DLD#=1, TLD#=0, CNT=0), the state machine 300 transitions to the tag access state 330. If the control logic 110 receives another concurrent data and tag access command (i.e., DLD#=0, TLD#=0, CNT=0, 4), the state machine 300 remains in the data and tag access state 340. If a command is not received by the data array 100 (i.e., DLD#=1, TLD#=1, CNT=0), the state machine 300 returns to the NOP state 310 and waits for the next command.

The operation of the control logic 110 is further described in reference to the timing diagram of FIGS. 4A and 4B. FIG. 4B is a continuation of the timing diagram of FIG. 4A. The timing diagram illustrates the timing of the clock signals, CK and CQ, the shared address signal, SA, the tag and data command signals, DLD# and TLD#, and the read/write signal, R/W#. In the timing illustration of FIGS. 4A and 4B the memory device 35 is operating using a read latency of 1.5 cycles. Transitions in the clock signal, CK, are referred to as edges, with a suffix of "r" designating a rising clock edge, and a suffix of "f" designating a falling clock edge.

A first command is received at edge 1r of the CK signal. The command initiates a concurrent read to the data and tag arrays 100, 105 at shared address A1. Accordingly, the DLD# and TLD# signals are asserted and the R/W# signal is at a high logic level (i.e., DLD#=TLD#=0, R/W#=1). The cache data burst Q11 through Q18 and the tag data Q1 are output from the memory device 35 beginning at the CK edge 2f (i.e., corresponding to the latency of 1.5 cycles) and are received by the microprocessor 15 on a later edge (not shown).

At edge 3r, a tag array write command (i.e., R/W#=0, TLD#=0) is registered at shared address A3. The latency of 1.5 cycles does not impact write accesses. Accordingly, the tag data D3 is registered into the memory device 35 at edge 4r coincident with cache data Q14. This timing of the tag access corresponds to CNT=4 during of the eight beat cache data burst from shared address A1.

At edge 5r another concurrent data and tag read command (i.e., DLD#=TLD#=0, R/W#=1) is registered for shared address A5. The cache data Q51 through Q58 and the tag data Q5 are output from the memory device 35 at the CK edge 6f. A tag write (i.e., TLD#=0, R/W#=0) at shared address A7 is received at CNT =4 of the Q51 through Q58 burst. The tag data D7 is registered into the memory device 35 at edge 8r.

A concurrent data and tag write (i.e., DLD#=TLD#=0, R/W#=0) to shared address AA is received at edge 10r. The cache data burst DA1 through DA8 begins at edge 11r, and the tag data DA is registered written at edge 11r. A tag read (i.e., TLD#=0, R/W#=1) at shared address AC is received at CNT=4 of the DA1 through DA8 burst. Due to the latencies involved with the read and write accesses, the tag access, which was issued on the CNT=4 beat (i.e., 4 half cycles after the write to shared address AA), results in the tag data QC being delivered by the memory device 35 at edge 13f.

A data array 100 only write (i.e., DLD#=0, R/W#=0) to shared address AE is registered at edge 14r. The cache data burst DE1 through DE8 begins at edge 15r. A tag read (i.e., TLD#=0, R/W#=1) at shared address AG is received at the CNT=4 beat of the DA1 through DA8 burst. The tag data QG is read from the memory device at edge 17f.

A concurrent data and tag read (i.e., DLD#=TLD#=0, R/W#=1) to shared address AJ is received at edge 18r. The cache data burst QJ1 through QJ8 begins at edge 19f, and the tag data QJ is read at edge 19f.

The previous illustration shown in FIG. 4 illustrates that reads and writes to the tag and data arrays 105, 100 may be intermingled without restrictions. Accessing the tag array 105 during a burst access from the data 100 has numerous advantages. The overall speed of the memory device is increased, because commands can be issued before the end of a burst access. The microprocessor 15 can perform snooping operations on a different address from the tag array 105 during the burst access. Accordingly, the microprocessor 15 may be made aware of data not being present in the data array 100 before the end of the current burst, and a request may be issued to the system memory controller 25 to retrieve the data from the main memory device 30. The programmable latency feature also improves the flexibility of the memory device 35.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A memory device, comprising:
   a data array adapted to store a plurality of data array entries;
   a tag array adapted to store a plurality of tag array entries corresponding to the data array entries; and
   control logic adapted to access a subset of the data array entries in the data array using a burst access and to access the tag array during the burst access, the burst address being associated with a first address, and the access to the tag array being associated with a second address different from the first address.

2. The memory device of claim 1, further comprising:
   an address register coupled to the control logic and adapted to receive a shared address, wherein the control logic is adapted to access at least one of the data array and tag array based on the shared address.

3. The memory device of claim 2, further comprising:
   a burst counter coupled to the address register and the control logic and being adapted to receive at least a portion of the shared address and generate an internal address, wherein the control logic is adapted to receive the internal address, and the burst access is based on the internal address.

4. The memory device of claim 1, wherein the control logic is adapted to receive an external command for accessing at least one of the data array and the tag array.

5. The memory device of claim 4, further comprising a data array command register adapted to store a data array access signal, wherein the external command is based on the data array access signal.

6. The memory device of claim 4, further comprising a tag array command register adapted to store a tag array access signal, wherein the external command is based on the tag array access signal.

7. The memory device of claim 4, further comprising a read/write command register adapted to store a read/write signal, wherein the external command is based on the read/write signal.

8. The memory device of claim 1, wherein the burst access comprises eight data array accesses and the control logic is adapted to access the tag array on the fifth data array access.

9. The memory device of claim 1, wherein the burst access comprises N data array accesses and the control logic is adapted to access the tag array on the N/2+1 data array access.

10. The memory device of claim 1, wherein the control logic adapted to access the subset of the data array entries based on a programmable latency.

11. A computer system, comprising:
    a processing unit adapted to issue a data access command and a tag access command, the data access command including a first address, and the tag access command including a second address different from the first address; and
    a cache memory device, the cache memory device, comprising:
    a data array adapted to store a plurality of data array entries;
    a tag array adapted to store a plurality of tag array entries corresponding to the data array entries; and
    control logic adapted to access a subset of the data array entries in the data array using a burst access based on the data access command and to access the tag array during the burst access based on the tag access command.

12. The computer system of claim 11, wherein the cache memory device further comprises:
    an address register coupled to the control logic and adapted to receive a shared address from the processing unit, wherein the control logic is adapted to access at least one of the data array and tag array based on the shared address.

13. The computer system of claim 12, wherein the cache memory device further comprises:
    a burst counter coupled to the address register and the control logic and being adapted to receive at least a portion of the shared address and generate an internal address, wherein the control logic is adapted to receive the internal address, and the burst access is based on the internal address.

14. The computer system of claim 11, wherein the cache memory device further comprises a data array command register adapted to store the data access command.

15. The computer system of claim 11, wherein the cache memory device further comprises a tag array command register adapted to store the tag access command.

16. The computer system of claim 11, wherein the processing unit is adapted to provide a read/write command, the cache memory device further comprises a read/write command register adapted to store the read/write command, and the control logic is adapted to access at least one of the data array and the tag array based on the read/write command.

17. The computer system of claim 11, wherein the burst access comprises eight data array accesses and the control logic is adapted to access the tag array on the fifth data array access of the eight data array access.

18. The computer system of claim 11, wherein the burst access comprises N data array accesses and the control logic is adapted to access the tag array on the N/2+1 data array access.

19. The computer system of claim 11, wherein the control logic adapted to access the subset of the data array entries based on a programmable latency.

20. A method for accessing a memory device, the memory device including a data array and a tag array, the method comprising:
    receiving a data array burst access command and a first shared address;
    accessing the data array in response to the data array burst access command based on the first shared address;
    receiving a tag array access command and a second shared address; and
    accessing the tag array in response to the tag array access command based on the second shared address while accessing the data array.

21. The method of claim 20, further comprising:
    receiving at least a portion of the first shared address; and
    generating an internal address by incrementing the portion of the first shared address, wherein accessing the data array includes accessing the data array based on the first shared address and the internal address.

22. The method of claim 20, wherein accessing the data array includes accessing the data array using an eight beat burst, and accessing the tag array includes accessing the tag array on the fifth beat of the eight beat burst.

23. The method of claim 20, wherein accessing the data array includes accessing the data array using an burst having N beats, and accessing the tag array includes accessing the tag array on the N/2+1 beat of the N beat burst.

24. The method of claim 20, wherein accessing the data array and accessing the tag array include accessing the data array and the tag array based on a programmable latency.

25. A memory device, comprising:

means for storing a plurality of data entries;

means for storing a plurality of tag entries corresponding to the data entries;

means for receiving a data array burst access command including a first address;

means for accessing at least a subset of the data entries in response to the burst access command based on the first address;

means for receiving a tag access command including a second address different than the first address; and means for accessing at least one of the tag entries in response to the tag access command based on the second address while accessing the subset of data entries.

* * * * *